(12) United States Patent
Townsend et al.

(10) Patent No.: US 8,466,879 B2
(45) Date of Patent: Jun. 18, 2013

(54) MULTI-TOUCH MANIPULATION OF APPLICATION OBJECTS

(75) Inventors: Reed L. Townsend, Kirkland, WA (US); Xiao Tu, Sammamish, WA (US); Bryan D. Scott, Bothell, WA (US); Todd A. Torset, Woodinville, WA (US); Erik M. Geidl, Moscow, ID (US); Samir S. Pradhan, Bellevue, WA (US); Jennifer A. Teed, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 12/258,437

(22) Filed: Oct. 26, 2008

(65) Prior Publication Data

US 2010/0103117 A1    Apr. 29, 2010

(51) Int. Cl.
    *G06F 3/41* (2006.01)
(52) U.S. Cl.
    USPC ............................................ 345/173; 345/178
(58) Field of Classification Search
    USPC .......... 345/156–174, 428, 650, 660; 715/205, 715/234, 863, 864; 178/18.05; 382/188
    See application file for complete search history.

(56) References Cited

U.S. PATENT DOCUMENTS

| | | | | |
|---|---|---|---|---|
| 6,323,846 B1* | 11/2001 | Westerman et al. | ......... | 345/173 |
| 6,597,378 B1* | 7/2003 | Shiraishi et al. | ............. | 715/764 |
| 7,826,641 B2* | 11/2010 | Mandella et al. | ............ | 382/106 |
| 8,232,990 B2* | 7/2012 | King et al. | .................... | 345/419 |
| 2002/0015024 A1* | 2/2002 | Westerman et al. | ......... | 345/173 |
| 2006/0077183 A1* | 4/2006 | Studt | ............................ | 345/173 |
| 2006/0197753 A1* | 9/2006 | Hotelling | ...................... | 345/173 |
| 2007/0152984 A1* | 7/2007 | Ording et al. | ................. | 345/173 |
| 2007/0177804 A1* | 8/2007 | Elias et al. | ..................... | 382/188 |
| 2008/0042986 A1* | 2/2008 | Westerman et al. | .......... | 345/173 |
| 2008/0163130 A1* | 7/2008 | Westerman | .................... | 715/863 |
| 2008/0165140 A1* | 7/2008 | Christie et al. | ................. | 345/173 |
| 2008/0165210 A1* | 7/2008 | Platzer et al. | ................... | 345/672 |
| 2008/0165255 A1* | 7/2008 | Christie et al. | ........... | 348/207.99 |
| 2008/0168384 A1* | 7/2008 | Platzer et al. | ................... | 715/784 |
| 2008/0168403 A1* | 7/2008 | Westerman et al. | .......... | 715/863 |
| 2008/0180406 A1* | 7/2008 | Han et al. | ....................... | 345/173 |
| 2008/0291174 A1* | 11/2008 | Mazeev et al. | ................. | 345/173 |
| 2009/0184939 A1* | 7/2009 | Wohlstadter et al. | ......... | 345/173 |
| 2009/0213084 A1* | 8/2009 | Kramer et al. | ................. | 345/173 |
| 2009/0225037 A1* | 9/2009 | Williamson et al. | .......... | 345/173 |
| 2009/0225039 A1* | 9/2009 | Williamson et al. | .......... | 345/173 |
| 2009/0256817 A1* | 10/2009 | Perlin et al. | .................... | 345/174 |
| 2009/0273560 A1* | 11/2009 | Kalanithi et al. | .............. | 345/156 |
| 2010/0001998 A1* | 1/2010 | Mandella et al. | .............. | 345/419 |
| 2010/0020025 A1* | 1/2010 | Lemort et al. | ................. | 345/173 |
| 2010/0130280 A1* | 5/2010 | Arezina et al. | ................... | 463/20 |
| 2010/0149073 A1* | 6/2010 | Chaum et al. | ...................... | 345/8 |
| 2011/0111840 A1* | 5/2011 | Gagner et al. | ................... | 463/25 |
| 2011/0157196 A1* | 6/2011 | Nave et al. | ..................... | 345/522 |
| 2011/0314429 A1* | 12/2011 | Blumenberg | .................. | 715/863 |

\* cited by examiner

*Primary Examiner* — Prabodh M Dharia

(57) ABSTRACT

The manipulation system described herein provides a common platform and application-programming interface (API) for applications to communicate with various multi-touch hardware devices, and facilitates the interpretation of multi-touch input as one or more manipulations. Manipulations map more directly to user intentions than do individual touch inputs and add support for basic transformation of objects using multiple touch contacts. An application can use manipulations to support rotating, resizing, and translating multiple objects at the same time. The manipulation system outputs two-dimensional (2D) affine transforms that contain rotation, scale, and translation information. Thus, using the manipulation system the application author can focus more on building touch-capable applications and let the manipulation system handle the underlying transformations and communication with the multi-touch hardware.

19 Claims, 5 Drawing Sheets

MULTI-TOUCH MANIPULATION OF APPLICATION OBJECTS

BACKGROUND

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world.

Multi-touch (or multitouch) denotes a set of interaction techniques that allow computer users to control graphical applications using multiple fingers or input devices (e.g., stylus). Multi-touch implementations usually include touch hardware (e.g., a screen, table, wall, and so on) and software that recognizes multiple simultaneous touch points. Multi-touch stands in contrast to traditional touch screens (e.g., computer touchpad, ATM, shopping kiosk) that only recognize one touch point at a time. Multi-touch hardware can sense touches using heat, finger pressure, high capture rate cameras, infrared light, optic capture, tuned electromagnetic induction, ultrasonic receivers, transducer microphones, laser rangefinders, shadow capture, and other mechanisms. Many applications for multi-touch interfaces exist and application designers and users are proposing even more. Some uses are individualistic (e.g., Microsoft Surface, Apple iPhone, HTC Diamond). As a new input method, multi-touch offers the potential for new user experience paradigms.

An application cannot use multi-touch hardware without an interface for the application software to receive information from the multi-touch hardware. Unfortunately, each multi-touch hardware device includes its own proprietary interface and application authors must have specific knowledge of a hardware device to write software that works with the device. For example, a multi-touch hardware provider may provide a kernel-mode driver and a user-mode application interface through which user-mode software applications can communicate with the multi-touch hardware to receive touch information. An application author writes software that communicates with the user-mode application interface, but the application author's software works only with that multi-touch hardware. A computer user with a different multi-touch hardware device cannot use the application author's software unless the application author produces a different version of the software that operates correctly with the computer user's device. This produces a very limited potential market for application authors, reduces the incentive to write applications supporting multi-touch interactions, and keeps the cost of the most popular devices high for which the greatest number of applications is available.

Another problem is the difficulty for applications to determine a user's intentions based on touch input received from multi-touch hardware. Touch input may be received as a list of coordinates where the hardware senses touch input at any given time. Each application has to include software to interpret the coordinates and determine the user's intention. For example, if an application receives information about two different touches, a first touch at one position then later a second touch at a new position, it is up to the application to determine whether the user used one finger for the first touch and another for the second touch, or whether the user slid the same finger from one location to another location to produce the first touch and the second touch. Depending on the purpose of the application, these two different interpretations of the user input can have very different meanings.

SUMMARY

The manipulation system described herein provides a common platform and application-programming interface (API) for applications to communicate with various multi-touch hardware devices, and facilitates the interpretation of multi-touch input as one or more manipulations. Manipulations map more directly to user intentions than do individual touch inputs and add support for basic transformation of objects using multiple touch contacts. An application can use manipulations to support rotating, resizing, and translating multiple objects at the same time. The manipulation system outputs two-dimensional (2D) affine transforms that contain rotation, scale, and translation information. Thus, using the manipulation system the application author can focus more on building touch-capable applications and let the manipulation system handle the underlying transformations and communication with the multi-touch hardware.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The manipulation system provides a common platform and API for applications to communicate with various multi-touch hardware devices, and facilitates the interpretation of multi-touch input as one or more manipulations. Manipulations map more directly to user intentions than do individual touch inputs and add support for basic transformation of objects using multiple touch contacts. For example, an application author receiving manipulations from the manipulation system can differentiate a user sliding a finger from one location to another from a user setting down two different fingers without performing additional interpretation of the input. Manipulations provide support for multiple simultaneous interactions. An application can use manipulations to support rotating, resizing, and translating multiple objects (e.g., photos) at the same time. Unlike typical window-based user interfaces, there are no notions of focus or activation tying the user to a single input at a time. In addition, applications can retrieve manipulation information. The manipulation system outputs 2D affine transforms that contain rotation, scale (e.g., zoom), and translation (e.g., pan) information.

A contact is an individual touch of the multi-touch hardware. For example, when a user sets his/her finger on the multi-touch hardware, moves his/her finger around, and lifts his/her finger, that series of events is a single contact. The system identifies each contact with a contact identifier. A contact keeps the same identifier for as long as it exists. As the user moves various contacts around, the system interprets the movement as one or more manipulations. For example, if the user moves two contacts closer together or further apart, the system may determine that the user is scaling (e.g., zooming into or out from) an object. As another example, if the user moves multiple contacts in a circular motion, then the system may interpret the movement as a rotation of an object. Each application can define objects that are relevant differently, so it is up to the application to attach an instance of the system (called a manipulation processor) to each object that a user can manipulate using touch input within the application. For example, a photo browsing application may attach a manipulation processor to each displayed photo, so that the user can move the photos around, scale the photos, rotate the photos, and so forth. Thus, the application author can focus more on building touch-capable applications and let the manipulation system handle the underlying transformations and communication with the multi-touch hardware.

Figure 1:
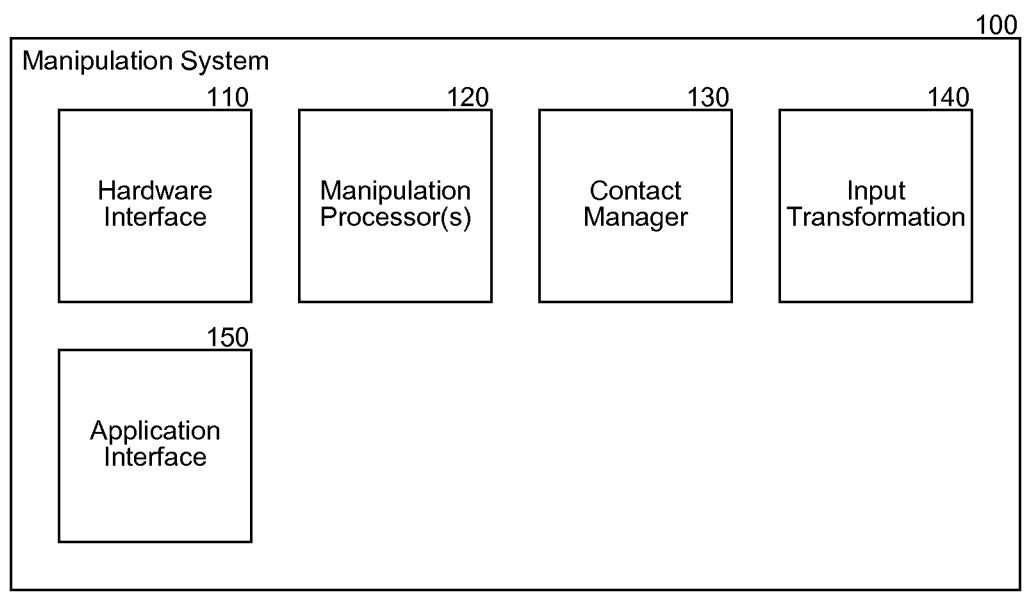
FIG. 1 is a block diagram that illustrates components of the manipulation system, in one embodiment.

FIG. 1 is a block diagram that illustrates components of the manipulation system, in one embodiment. The manipulation system 100 includes a hardware interface 110, one or more manipulation processors 120, a contact manager 130, an input transformation component 140, and an application interface 150. Each of these components is described in further detail herein.

The hardware interface 110 communicates with the hardware to receive touch contacts and movements. The hardware interface 110 may include several subcomponents that work together to provide touch input information. For example, the operating system may provide a common driver model for multi-touch hardware manufacturers to provide touch information for their particular hardware. The operating system may translate touch information received through this model into window messages (e.g., WM_TOUCH described herein) and pass these messages to the application. Thus, the hardware interface 110 may involve the coordination of the hardware, a hardware driver, and an operating system layer. The result is a series of messages to the manipulation system that identify a particular contact (e.g., touch of a finger), and the coordinates of the contact over time. For example, the operating system may provide a message when a new contact is set down on the multi-touch hardware, a message each time the contact moves, and a message when a user lifts the contact away from the multi-touch hardware.

One or more manipulation processors 120 use the input transformation component 140 to interpret movement of each contact associated with a particular application object. The manipulation processor 120 may determine that a user is using multiple contacts to perform a single action. For example, a user could touch a photo with all five fingers of one hand and twist his/her hand to indicate an intention to rotate the photo. The manipulation processor 120 receives five separate contacts (one for each finger) and the change in coordinates of each contact as the user rotates his/her hand. The manipulation processor 120 determines that each contact is grabbing the same object and performing the same rotation. The system will inform the application that the user rotated the object, but the application can ignore whether the user used two, five, or any particular number of fingers or other contacts to perform the rotation. This greatly simplifies the authoring of the application because the application author can handle those types of manipulations that are relevant to the application and leave it to the manipulation system to interpret the meaning of each low-level touch input received from the multi-touch hardware.

Each manipulation processor 120 manages a list of contacts associated with the manipulation processor, and stores velocity vector and translation information about the contacts as the manipulation processor 120 receives new low-level touch information. The contact manager 130 represents the part of the system 100 that handles contact management for manipulation processors 120. It is up to the application to inform the manipulation system which contacts should be associated with each manipulation processor. The application can make this determination when the application receives low-level touch information, for example, by hit testing application objects using coordinates associated with the received low-level touch information. For example, if a user places three fingers on the same photo in a photo editing application, the application determines that the contact associated with each finger is touching the same object, and associates each of the three contacts with the same manipulation processor. The contact manager 130 manages the list of associated contacts on behalf of the manipulation processor 120 and tracks the movement of the contacts to interpret manipulations of the associated object intended by the user.

The manipulation processor 120 uses the input transformation component 140 to make determinations about the meaning of received movements of various contacts, both alone and in concert. For example, if a user is manipulating a photo with two fingers, which creates two corresponding input contacts, then the manipulation processor 120 uses the input transformation component 140 to determine the meaning of relative movements between the two contacts. If the two contacts move apart, then the input transformation component 140 may determine that the user is scaling the object to change the object's size. If the two contacts rotate, then the input transformation component 140 may determine that the user is rotating the object. If the two contacts both slide in a particular direction, then the input transformation component 140 may determine that the user is panning the object to a new location. Although each type of movement is described separately herein, a user can make all three types of movements at the same time, and the input transformation processor can report the overall transformation to the application. For example, a user can rotate, scale, and pan an object all in one motion.

The application interface 150 communicates with the application to receive information and provide manipulation transforms to the application. The application interface 150 receives initialization information from the application. The initialization information may specify which types of transforms the application object supports for a particular object and associated manipulation processor. For example, some application objects may support scaling but not rotation. The initialization information may also specify a pivot point of the object. The manipulation system provides manipulation transforms to the application through the application interface. For example, when the manipulation system receives low-level touch input that the system interprets as a recognized transform (e.g., a rotation), the system fires an event to notify the application about the manipulation. The application processes the manipulation transform to modify the object based on the transform. For example, if the user rotated the object, then the application may store the new orientation of the object to use the next time the application displays the object.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
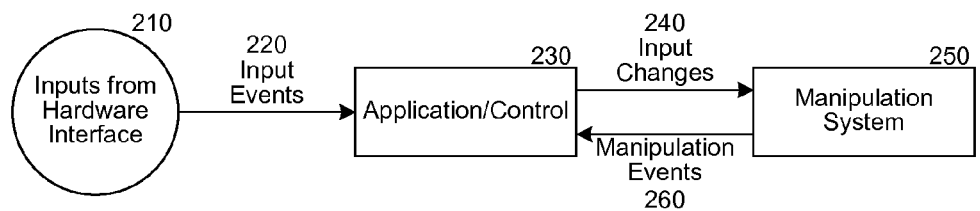
FIG. 2 is a data flow diagram that illustrates a typical operating environment of the manipulation and the flow of data between components, in one embodiment.

FIG. 2 is a data flow diagram that illustrates a typical operating environment of the manipulation system and the flow of data between components, in one embodiment. A multi-touch hardware device produces inputs 210 through a hardware interface. For example, the hardware may send the inputs 210 to an operating system through a software driver provided by the hardware manufacturer. The hardware interface provides input events 220 to an application 230. For example, an application may inform the operating system that the application 230 supports multi-touch user input and register to receive messages related to multi-touch user input. The application 230 receives low-level touch input information as input changes 240 and forwards the input changes 240 to the manipulation system 250 described herein. For example, the input changes 240 may describe each movement of one or more touch contacts with the hardware using a set of coordinates that indicate each contact's current position and other movement characteristics. The manipulation system 250 interprets the input changes 240 and notifies the application 230 of one or more manipulation events 260 that indicate higher-level manipulations that the user is performing on a displayed object. For example, if the movement of the contacts indicates that the user intends to rotate the object, the manipulation events 260 indicate a degree of rotation.

Although the diagram illustrates that the application first receives touch input and passes the touch input to the manipulation system, in some embodiments, the manipulation system receives touch input directly from the hardware interface, interprets the touch input, and provides interpreted manipulation events to the application. This represents an alternative architecture that provides similar resultant functionality but gives the application less control over the processing of the input. For example, the application may not be able to define individual application objects to which the system attaches individual manipulation processors. The RTS plug-in described herein is one example of this alternative architecture for the system.

Figure 3:
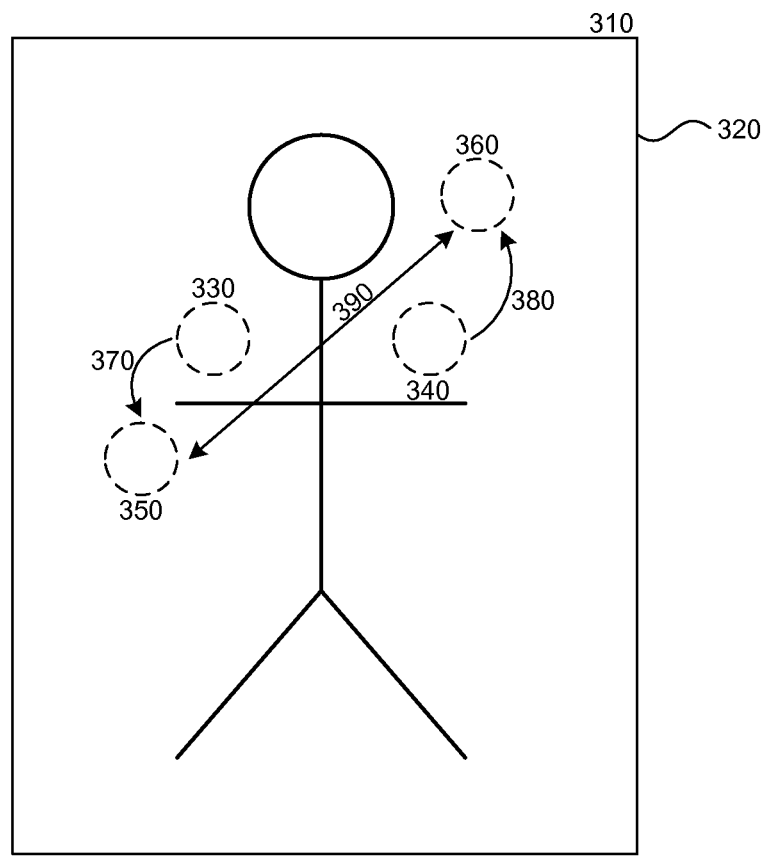
FIG. 3 is a display diagram that illustrates an application object manipulated by touch input, in one embodiment.

FIG. 3 is a display diagram that illustrates an application object manipulated by touch input, in one embodiment. An application may simultaneously display and receive touch input for many such objects. For example, the objects may represent one or more photographs stored on the user's computer. The object 310 has a boundary 320 defined by the application based on the application's particular domain. For example, a photo browsing application may have objects that represent user photos and the application may define the edge of each displayed photo as an object boundary 320. A user touches the object with two initial contacts at locations 330 and 340. For example, the user may set his/her thumb at location 330 and index finger at location 340. Then, the user rotates his/her fingers and moves them apart, such that the contacts end at locations 350 and 360. The lines 370 and 380 illustrate the approximate rotation performed by the user's movement. The line 390 illustrates the approximate stretching performed by the user's movement. Rather than provide the individual coordinates of the touch contacts 330-360, the manipulation system can indicate to the application the transforms performed by the user, such as the degree of rotation and the scale factor related to the stretching.

Figure 4:
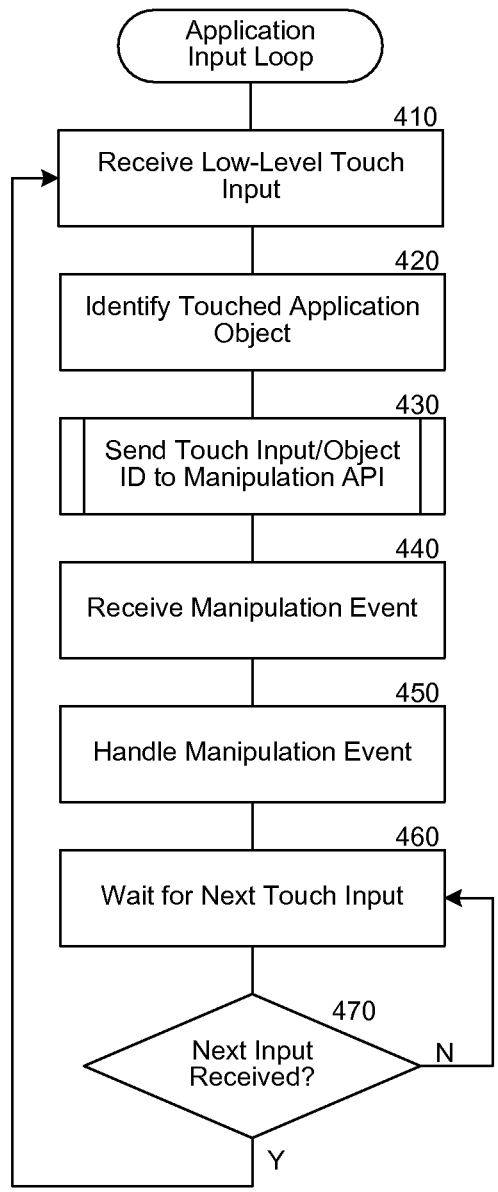
FIG. 4 is a flow diagram that illustrates the input loop processing of a multi-touch application using the manipulation system, in one embodiment.

FIG. 4 is a flow diagram that illustrates the input loop processing of a multi-touch application using the manipulation system, in one embodiment. In block 410, the application receives low-level touch input. For example, an operating system or instance of the manipulation system receives touch contact information from multi-touch hardware and forwards the touch contact information to the application. In block 420, the application identifies the object to which the input applies. For example, the application may hit test the coordinates of the received input by comparing the coordinates with the coordinates of each application object displayed by the application. If the touch input is within the boundaries of a displayed application object, then the application determines that the touch input applies to that object. In block 430, the application sends the received touch input and the information about the identified application object to a manipulation API for invoking the manipulation system (see FIG. 5). For example, the application may create a numeric identifier for each application object and pass the numeric identifier to the manipulation system each time touch input corresponds to that object.

In block 440, the application receives a manipulation event from the manipulation system that describes one or more manipulations of the identified application object. For example, the application may receive an event describing a 2D affine transform of the application object. Block 440 is illustrated serially after block 430 for simplicity of illustration. In practice, the application may receive many touch input events before the manipulation system notifies the application with a manipulation event. There is not necessarily a one-to-one mapping of touch input events to manipulation events. Because manipulation events represent a higher-level interpretation of low-level touch inputs, multiple touch inputs may make up a single manipulation event. In block 450, the application handles the received manipulation event. For example, if the received manipulation event is a rotation, then the application may rotate the application object on the screen and store the application objects new location for use when the application displays the application object again.

The manipulation system frees the application from performing steps specific to a particular multi-touch hardware device or even from knowing which hardware device is providing the multi-touch input. In addition, the manipulation system frees the application from processing individual contact movement and allows the application to focus on processing transforms at the application object level.

In block 460, the application waits for the next touch input. For example, the application may call an operating system provided message API, such as GetMessage on Microsoft Windows that waits for the next message to be delivered to the application's message queue. In decision block 470, if the application receives the next touch input, then the application loops to block 410 to process the input, else the application loops to block 460 to continue waiting for further input. When the application closes, the application exits the input loop (not shown).

Figure 5:
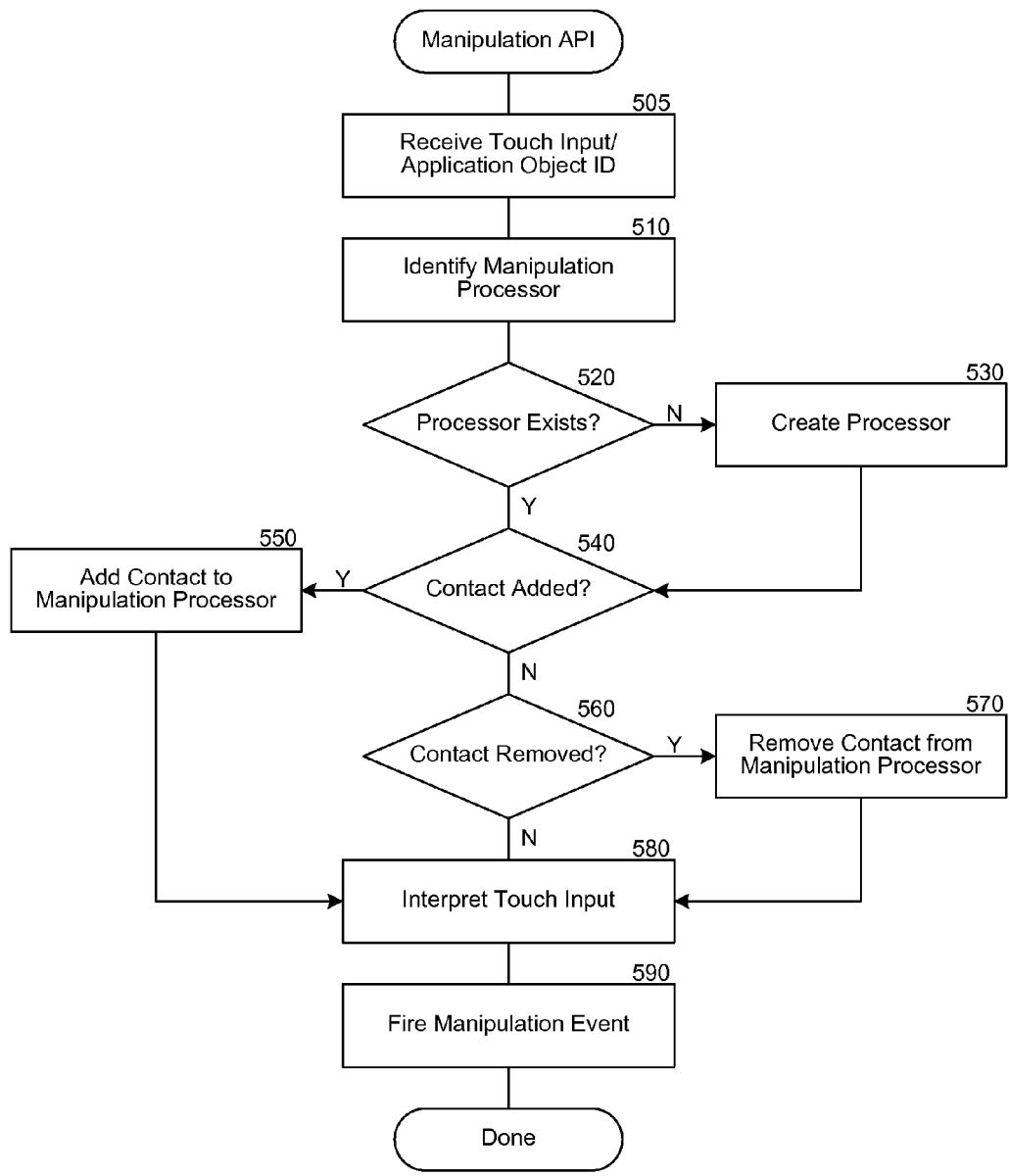
FIG. 5 is a flow diagram that illustrates the processing of the manipulation system when the system receives touch input, in one embodiment.

FIG. 5 is a flow diagram that illustrates the processing of the manipulation system when the system receives touch input, in one embodiment. In block 505, the system receives touch input along with information identifying an application object with which the touch input is associated. For example, the touch input may include coordinates or other location information of one or more touch contacts, and the application object information may include an identifier that the application assigned to a particular displayed object that the touch input is over on the multi-touch hardware. In block 510, the system identifies a manipulation processor associated with the application object. In decision block 520, if the system has not previously associated a manipulation processor with the application object, then the system continues at block 530, else the system continues at block 540. In block 530, the system creates a manipulation processor and associates it with the application object, then continues at block 540.

In decision block 540, if the received touch input indicates that the application received a new contact (e.g., a touch down event), then the system continues at block 550, else the system continues at block 560. For example, a user may make initial contact of a finger with an on-screen object, or set down another finger (i.e., contact) on a previously touched object. In block 550, the system adds the new contact to the list of contacts associated with the manipulation processor, and then continues at block 560. In decision block 560, if the received touch input indicates that the application received notification that a touch contact was removed (e.g., a touch up event), then the system continues at block 570, else the system continues at block 580. For example, the user may lift one or more fingers from a previously touched object. In block 570, the system removes the contact from the list of contacts associated with the manipulation processor, and then continues at block 580. In block 580, the system processes the touch input to determine any manipulations represented by the touch input. For example, touch movement may indicate a rotation or translation manipulation, while touch contact removal may indicate completion of a manipulation. In block 590, the system fires a manipulation event to send transform information describing the manipulation to the application. For example, the system may provide a degree of angular rotation of the object to the application. After block 590, these steps conclude.

In some embodiments, the manipulation system is part of a message-based operating system, and the system receives messages related to touch input that the operating system receives from the hardware. For example, using a paradigm similar to WM_MOUSEMOVE for mouse messages, future versions of Microsoft Windows may provide a WM_TOUCH message that contains low-level touch movement information received from multi-touch hardware. The operating system may also provide finer grained messages, such as WM_TOUCHDOWN (when a new contact is made with the multi-touch hardware), WM_TOUCHMOVE (when an existing contact moves), and WM_TOUCHUP (when a contact is lifted from the multi-touch hardware). An application that receives a WM_TOUCH-related message can invoke the manipulation system and pass the message to the manipulation system for interpretation and processing. The application then receives higher-level events that represent the manipulation system's interpretation of the manipulation intended by the user based on the received low-level touch movement information.

In some embodiments, the manipulation system receives low-level touch movement information from specialized hardware, such as a real-time stylus. For example, the Microsoft Tablet PC Software Development Kit (SDK) provides a real-time stylus (RTS) component that application authors can extend with hooks. RTS hooks receive input from the RTS hardware and can perform processing on the received input. The manipulation system may provide a hook that an application can insert into the RTS component to automatically process RTS and other input to manipulate application objects as described herein. The RTS hook provides a different way for the manipulation system to receive input, but the manipulation system interprets input and fires events to the application describing manipulations implied by the input as previously described. A user may use a combination of stylus and touch input. For example, the user may draw an object with the stylus and then rotate the object using his/her fingers.

In some embodiments, a manipulation processor of the manipulation system receives initialization information from the application using the system. For example, an application may initialize the manipulation processor with information about the location of the center of an application object. This can allow the manipulation processor to better interpret a user's intentions from received low-level touch input. For example, if the user rotates a single touch contact in an arc around the center of the application object, the processor can treat the motion as a rotation manipulation. Without the initialization information, the processor may interpret the same movement as simply panning the application object in the arc that the touch contact moved. Thus, by providing additional application context information to the manipulation processor, the application can allow the manipulation system to better interpret user manipulations.

In some embodiments, the manipulation system allows the application to reuse the same manipulation processor for the entire time that the user is manipulating a particular object. For example, the application may request that the system create a manipulation processor for each application object when the application starts and use that manipulation processor until the application closes. The application may also delay creation of each manipulation processor until a user interacts with a particular object using touch (e.g., when the application detects the first contact of an object). During the lifetime of a manipulation processor, contacts may come and go as the user lifts and touches the multi-touch hardware and performs various manipulations. The manipulation processor tracks the list of current contacts and the manipulations represented by the movement of the contacts as described herein.

In some embodiments, the manipulation system delays firing events to the application until the system has received an updated position for each contact associated with a particular manipulation processor or until a certain time has passed. If the system reacts too quickly, such as firing events after each received contact update, then problems such as stuttering may occur. For example, if a user touches an application object with two fingers and drags both fingers down the multi-touch hardware at the same time, it is likely that the system will receive updates for one contact slightly before updates for the other contact. If the system fires events for based on the contact updates as soon as the system receives the updates, the system will report that the object is rotating back and forth rapidly. If instead the system waits until receiving a new position for the second contact, or waits a period of time (e.g., 100 milliseconds) to receive an update for the second contact, then the system can correctly differentiate a situation where the user is moving both contacts in the same direction and the updates were received slightly apart in time from a situation where the user is in fact rotating the object by moving only one of the contacts. Thus, the system may perform this additional processing to provide a satisfactory user experience.

In some embodiments, the manipulation system is part of a common control that an application can invoke to provide a common user interface. Microsoft Windows provides common controls for displaying lists, trees, buttons, and so forth. Likewise, the manipulation system may provide a multi-touch based control for manipulating application objects in the ways described herein. For example, the system may provide a scatter control that allows the user to display one or more objects and manipulate the objects. The scatter control handles processing of low-level touch input and associating the input with a particular application object, and the application receives events from the control to handle the manipulations of the application objects. For example, if the control indicates that the user resized an object, then the application may store the objects new size.

In some embodiments, the manipulation system provides enhanced interpretation of single touch contacts. For example, as previously described the system can interpret rotation of a single contact around the center of an application object as a rotation rather than a translation when the application initializes the manipulation processor with the location of the center or other reference point (e.g., a corner) of the object. Similarly, the system can interpret other single touch movements according to a predefined meaning. For example, the system may treat a user rotating a single contact in a circle around the center of an object as a manipulation to scale the object rather than a rotation as would be literally implied by the user's movement.

In some embodiments, the manipulation system performs the processing described herein in three dimensions. Although two-dimensional multi-touch hardware is described herein, those of ordinary skill in the art will recognize that the processing of the system described herein can be applied equally well to three-dimensional (3D) manipulations if hardware is available to provide coordinate movement in three dimensions. For example, hardware that detects pressure or uses cameras to detect 3D movement of a user's fingers could provide the coordinates of movement in the third dimension to the manipulation system, and the manipulation system could then produce 3D transforms that describe manipulations (e.g., rotation, scaling, and translation) of objects in multiple 3D directions.

The following table defines one API that the manipulation system provides to applications for processing multi-touch user input.

| Properties: | |
|---|---|
| AutoTrack | Indicates whether down events should be used to automatically add input to the manipulation. |
| PivotPointX | Identifies the horizontal center of the object. |
| PivotPointY | Identifies the vertical center of the object. |
| PivotRadius | Determines how much rotation is used in single finger manipulation. |
| SupportedManipulations | Indicates which manipulations are supported by an object. |
| Methods: | |
| HRESULT CompleteManipulation( ); | Called when the developer chooses to end the manipulation. |
| HRESULT GetAngularVelocity( [out] FLOAT* pAngularVelocity ); | Calculates the rotational velocity at which the target object is moving. |
| HRESULT GetExpansionVelocity( [out] FLOAT* pExpansionVelocity ); | Calculates the rate at which the target object is expanding. |
| HRESULT GetVelocityX( [out] FLOAT* pX ); | Calculates and returns the horizontal velocity for the target object. |
| HRESULT GetVelocityY( [out] FLOAT* pY ); | Calculates and returns the vertical velocity. |
| HRESULT ProcessDown( MANIPULATION_ ID manipulationId, FLOAT x, FLOAT y, DWORD timestamp ); | Feeds data to the manipulation processor associated with a target. |
| HRESULT ProcessMove( MANIPULATION_ ID manipulationId, FLOAT x, FLOAT y, DWORD timestamp ); | Feeds data to the manipulation processor associated with a target. |
| HRESULT ProcessUp( MANIPULATION_ ID manipulationId, FLOAT x, FLOAT y, DWORD timestamp ); | Feeds data to the manipulation processor associated with a target. |
| Events: | |
| HRESULT ManipulationStarted( [in] FLOAT x, [in] FLOAT y ); | Handles the event when manipulation begins. |
| HRESULT ManipulationDelta( [in] FLOAT x, [in] FLOAT y, [in] FLOAT translationDeltaX, [in] FLOAT translationDeltaY, [in] FLOAT scaleDelta, [in] FLOAT expansionDelta, [in] FLOAT rotationDelta, [in] FLOAT cumulativeTranslationX, [in] FLOAT cumulativeTranslationY, [in] FLOAT cumulativeScale, [in] FLOAT cumulativeExpansion, [in] FLOAT cumulativeRotation ); | Handles events that happen when a manipulated object changes. |
| HRESULT ManipulationCompleted( [in] FLOAT x, [in] FLOAT y, [in] FLOAT cumulativeTranslationX, [in] FLOAT | Handles the event when manipulation finishes. |

-continued

```
cumulativeTranslationY,
  [in] FLOAT cumulativeScale,
  [in] FLOAT cumulativeExpansion,
  [in] FLOAT cumulativeRotation
);
```

In the table above, MANIPULATION_ID is an identifier that the application assigns to each application object that a user can manipulate. The application uses hit testing or other common methods to determine to which object received touch input applies, looks up the identifier associated with the object, and passes the identifier and the touch input to the manipulation API for processing.

From the foregoing, it will be appreciated that specific embodiments of the manipulation system have been described herein for purposes of illustration, but that various modifications may be made without deviating from the spirit and scope of the invention. For example, although rotation, scaling, and translation manipulations have been used as examples, other types of manipulations can be used with the system based on any type of manipulation users want to perform with multi-touch hardware. Accordingly, the invention is not limited except as by the appended claims.

We claim:

1. A method for interpreting low-level touch inputs into corresponding manipulation events, the method performed on a computing device having a touch-sensitive input surface and a display, the method comprising:
   receiving low-level touch inputs that correspond to touches of the touch-sensitive input surface, the low-level touch inputs comprising locations of contacts with the touch-sensitive input surface, the low-level touch inputs received by an application executing on the computing device;
   identifying, by the application, an application object, displayed on the display, to which the received low-level touch inputs apply;
   sending the received low-level touch inputs and information identifying the application object at a manipulation API (application programming interface), the manipulation API interpreting pluralities of the received low-level touch input as respective manipulation events, wherein the manipulation API is invocable by arbitrary applications on the computing device;
   receiving, at the application, the manipulation events, the manipulation events comprising affine transforms of the identified application object; and
   handling, by the application, the received manipulation events by displaying the application object according to the manipulation events.

2. The method of claim 1 wherein the low-level touch inputs are received via an operating system of the computing device.

3. The method of claim 1 wherein identifying an application object comprises hit testing coordinates of a low-level touch input by comparing the coordinates with coordinates of objects displayed by the application to determine whether the low-level touch input is within a boundary of a particular application object.

4. The method of claim 1 wherein the application has numeric identifiers for respective application objects displayed thereby, and the application and passes the numeric identifier for one of the application objects to the manipulation API each time a received low-level touch input corresponds to the one of the application objects.

5. The method of claim 4 wherein receiving the manipulation events comprises receiving the numeric identifier associated with the identified application object.

6. The method of claim 1 wherein a given received manipulation event comprises a rotation and wherein handling the given received manipulation event comprises rotating the application object on the display.

7. The method of claim 1 wherein the application performs the method in an input loop to process received multi-touch input while the application is running.

8. A computer-readable storage medium encoded with instructions for controlling a computer system to interpret multi-touch input as one or more application object manipulations, by a method comprising:
   receiving from an application touch input and information identifying an application object with which the touch input is associated;
   identifying, among a plurality of instances of manipulation processors associated with respective application objects, a manipulation processor specific to and associated with the identified application object, wherein each manipulation processor interprets, in a manner specific to its corresponding application object, movement of multiple contacts of the multi-touch hardware as one or more manipulations of the identified application object;
   processing, by the identified manipulation processor, the received touch input to interpret manipulations represented by the touch input, wherein the manipulations include at least one or more of rotation, translation, and scaling of the identified application object; and
   firing a manipulation event that sends transform information describing the interpreted manipulation to the application.

9. The computer-readable medium of claim 8 further comprising, when the received touch input indicates that the application received a new contact, adding the new contact to a list of contacts associated with the identified manipulation processor.

10. The computer-readable medium of claim 8 further comprising, when the received touch input indicates that the application received notification that a touch contact was removed, removing the contact from a list of contacts associated with the identified manipulation processor.

11. The computer-readable medium of claim 8 wherein the computer system provides an API through which the application provides touch input and receives transform information related to the identified application object.

12. A computer device for handling touch input from multi-touch hardware, the system comprising:
   a module that receives low-level inputs, for arbitrary applications on the computer device, from a multi-touch input device, and that translates the low-level inputs to manipulations that are then received by the arbitrary applications, wherein at least some of the manipulations are based on respective pluralities of the low-level inputs, the manipulations comprising affine transforms;
   an application comprising a graphic object displayed on the display, the graphic object interacted with by a user contacting the multi-touch input device such that low-level inputs corresponding to the user interaction with the graphic object are received by the module and the application receives corresponding manipulations translated by the module that the application uses to display the graphic object.

13. A computer device according to claim 12, wherein the module comprises:

an application programming interface (API) through which the arbitrary applications instantiate manipulation processor modules, each manipulation processor module corresponding to a different application object and handling interpretation of low-level inputs for the corresponding application objects.

14. A computing device according to claim 13, wherein a manipulation processor module comprises a unit that keeps track of low-level inputs received by the manipulation processor module.

15. A computing device according to claim 12, wherein the low-level inputs are received via an operating system and a device driver for the multi-touch input device.

16. A computing device according to claim 12, further comprising a windowing system, wherein the low-level inputs comprise window messages passed to the application by the windowing system.

17. A computing device according to claim 16, wherein the window messages include messages that correspond to new touches of the multi-touch input device, movements of touches of the multi-touch input device, and endings of touches of the multi-touch input device.

18. A computing device according to claim 12, wherein the module determines from the low-level inputs that the user is using multiple touches at one time to manipulate the graphic object.

19. A computing device according to claim 12, wherein the module receives from the application initialization information that specifies a pivot point of the graphic object and types of manipulations to be interpreted from the low-level inputs.

* * * * *